(12) United States Patent
Ikeda

(10) Patent No.: US 7,503,747 B2
(45) Date of Patent: Mar. 17, 2009

(54) ROTATABLE DUCT TYPE SHROUDED ROTATING WING

(76) Inventor: Kaidou Ikeda, 3-4-27 Mukodai-cho, Nishitokyo-shi, Tokyo (JP) 188-0013

( * ) Notice: Subject to any disclaimer, the term of this patent is extended or adjusted under 35 U.S.C. 154(b) by 392 days.

(21) Appl. No.: 10/586,652

(22) PCT Filed: Dec. 7, 2004

(86) PCT No.: PCT/JP2004/018183

§ 371 (c)(1),
(2), (4) Date: Jul. 19, 2006

(87) PCT Pub. No.: WO2005/070763

PCT Pub. Date: Aug. 4, 2005

(65) Prior Publication Data

US 2008/0240920 A1    Oct. 2, 2008

(30) Foreign Application Priority Data

Jan. 27, 2004 (JP) ............................. 2004-048686

(51) Int. Cl.
*F04D 29/00* (2006.01)
(52) U.S. Cl. .................. 415/229; 416/170 R; 416/189; 416/244 R
(58) Field of Classification Search .................. 415/91, 415/220, 229; 416/170 R, 174, 186 R, 189, 416/244 R
See application file for complete search history.

(56) References Cited

U.S. PATENT DOCUMENTS

| | | | | | |
|---|---|---|---|---|---|
| 4,720,640 | A | * | 1/1988 | Anderson et al. | 290/43 |
| 4,949,022 | A | * | 8/1990 | Lipman | 318/400.08 |
| 5,474,429 | A | * | 12/1995 | Heidelberg et al. | 417/356 |

FOREIGN PATENT DOCUMENTS

| | | |
|---|---|---|
| JP | 05-077789 | 3/1993 |
| JP | 07-205897 | 8/1995 |
| JP | 2001-097288 | 4/2001 |
| JP | 2003-137192 | 5/2003 |
| JP | 2003-290873 | 10/2003 |
| JP | 3595988 B | 9/2004 |

* cited by examiner

*Primary Examiner*—Ninh H Nguyen
(74) *Attorney, Agent, or Firm*—Bacon & Thomas, PLLC (57) ABSTRACT

In a rotatable duct type shrouded rotating wing, permanent magnets are arranged in the outer periphery of a rotatable duct, rotor blades are connected to the inner periphery of the rotatable duct, the rotor blades having a rotatable support portion at about every 2.5 m to prevent deflection or distortion. The shroud and the rotatable duct are constantly in vertical contact with each other, and an appropriate horizontal spacing is provided between the inner periphery of the shroud and the outer periphery of the rotatable duct to permit expansion and contraction of the rotatable duct and the rotor blades. Accordingly, even if the shrouded rotating wing is of a large radius, is used in a horizontal orientation and undergoes a rapid change of direction mounted to a turntable, it always rotates stably to generate lift and thrust.

5 Claims, 11 Drawing Sheets

ROTATABLE DUCT TYPE SHROUDED ROTATING WING

BACKGROUND OF THE INVENTION

1. Field of Art

The present invention relates to a shrouded rotating wing having an opening of a size exceeding a radius of approximately 3 m and operating based on the principle of a linear motor driving.

2. Background Art

The mechanism of coupling output from a prime mover, such as a turbine positioned near the center of a rotating wing, to a central driving shaft for rotation of the blades, thereby obtaining lift or thrust, has heretofore been used frequently in helicopters and other rotorcrafts. However, the method of making a rotating wing rotate around a shaft defining the central axis of rotation requires a vast amount of energy and thus the efficiency has been low.

Japanese "Kokai" (laid-open application publications) 2001-097288 and H07-205897 disclose a shrouded rotating wing for use as a tail rotor of a single rotor type helicopter. This shrouded rotating wing can rotate blades efficiently and change the rotational speed freely by making a change from the conventional method of transferring power to the central shaft of rotation to a method of generating a driving force at the wing tips.

Kokai H07-205897 discloses a driving method based on a linear motor principle using shroud-side magnets and wing-tip magnets as means for generating a driving force at wing tips. As disclosed therein, the wing-tip magnets may be fitted into the shroud or allowed to float within a space near the shroud-side magnets. In one embodiment wherein the wing tip magnets are fitted into the shroud, neither a rotary shaft nor a hub for connecting the wing center portions of rotor blades is used and, in another such embodiment, the rotor blades are connected to a rotary shaft. However, if the wing tip magnets are fitted into the shroud and neither a rotary shaft nor a hub is used, when the shrouded rotating wing is of a large caliber and is used in a horizontal position, blades tend to fall off due to their own weight and the rotating wing cannot withstand a sudden change of direction. In the type using a rotary shaft to which the rotor blades are connected, no consideration is given to expansion and contraction of the rotor blades, so when the wing caliber is large, the wing tips fitted in the shroud are pulled strongly toward the center due to the weight of the rotor blades, e.g. at the time of parking, resulting in an increase in resistance to rotation. Even if the rotating wing can start to begin rotating, there is a great possibility that the rotating wing will become unrotatable because no consideration is given to expansion and contraction due to centrifugal force or heat. In the type wherein the wing tips are allowed to float near the intra-shroud magnets, due to deflection or distortion of the rotor blades during parking, the wing-tip magnets tend to fall and the gap between the intra-shroud magnets and the wing-tip magnets increases, making the generation of a driving force impossible. Thus, a shrouded rotating wing having a small radius of about 50 to 60 cm is practical when used in the vertical position, that is, when used as a tail rotor of a single rotor type, but it is very difficult to use a shrouded rotating wing of a large caliber in a horizontal orientation or where the blow-off direction is changed rapidly such as that in Japanese Patent Application 2003-290873.

In Japanese Kokai 2001-097288, the principle of an electric motor (basically the same as the principle of a linear motor) is enlarged by mounting a rectifier on a rotary shaft whereby an electric current converted to an alternating voltage by the rectifier is conducted from the wing tips onto a ring, through the rotor blades, to energize electromagnetic coils including an iron core which are embedded in the ring, thereby affording a driving force. Therefore, the ring and the blade tips are fixed together, and when the blades expand or contract to a larger extent than the estimated 3~5 mm, the operation of the rotating wing becomes difficult. Besides, since the coils through which an electric current flows to generate a magnetic force are embedded together with an iron core into the ring, it is presumed that the ring itself will produce heat. When these influences are taken into account, even if the rotating wing is used in a vertical position as illustrated in the drawings of Kokai 2001-097288, the diameter of 1 to 1.2 m (radius 50~60 cm) estimated by the inventor is considered to be the limit for size capable of being manufactured.

As reported in Japanese Patent Application 2002-383031 and Kokai 2001-097288, the length of each rotor blade changes due to centrifugal force or a change in temperature. When the rotating wing is about 0.5 to 0.6 m (50 to 60 cm) in radius and is used in a vertical position, as a tail rotor (Kokai 2001-097288 and H07-205897), a change in length, even when estimated to be maximum, is about 0.6% of the rotor blade length, i.e., 0.003 to 0.004 m (3 to 4 mm). Thus, the change is within the single digit range of millimeters and therefore can be absorbed by an outer projection or the like of the ring as in Kokai 2001-097288. However, when the rotating wing is used horizontally as a main rotor, the influence of deflection or distortion of the rotor blades is added to that of the centrifugal force and the temperature change, and during parking, a decrease in projection radius of about 2% is observed in the direction opposite to the direction of the centrifugal force. When the radius of the main motor is 5 m, the expansion caused by centrifugal force, for example, is about 0.03 m (3 cm) and the decrease in projection radius due to deflection or distortion is as large as about 0.1 m (10 cm), with the total being 0.13 m (13 cm) which is on the order of ten-odd centimeters. Thus, in the methods disclosed in Kokai 2001-097288 and H07-205897, it is extremely difficult to maintain an appropriate gap between the magnets which create the driving force and it has so far been impossible to adopt the method disclosed in Japanese Patent Application 2003-290873.

In Japanese application 2002-383031, in order to absorb deflection and distortion of the rotor blades which can cause a change in radius of gyration reaching ten-odd centimeters, and to thereby keep the gap between the shroud-side magnets and the rotor blade wing-tip magnets at an appropriate value, allowing the linear motor driving principle to be exhibited in a stable manner, an electromechanical device is installed within each rotor blade. However, the weight of the rotor blades is increased and the structure is complicated, resulting in an increase in the number of parts and fear of an increase in the number of failure generating factors. Moreover, the wing tips are each independent, so when a load is imposed on a certain specific rotor blade, the dispersion of the load is insufficient and the load of its wing tip imposed on the shroud becomes large. Particularly, when the rotating wing is put on a single-shaft turntable and attached to a flying body as in Japanese Patent Application 2003-290873, abnormal forces are generated against the shroud at two positions, one of which is the nearest to and the other remotest from a side wall of the flying body, by a gyro effect. Even if such portions are strengthened, the service life may be extremely shortened or the portions in question may be damaged.

A shrouded rotating wing based on the driving principle of a linear motor or a shrouded rotating wing based on the principle of an electric motor is simple in structure and light in weight when it is of a small caliber and is used vertically. However, when a shrouded rotating wing of a large caliber is used horizontally, it may become difficult keep an appropriate gap between the driving force generating electromagnets and permanent magnets, due to deflection or distortion induced by centrifugal force, heat, or due to the weight of its rotor blades, or the rotation of the rotatable portion may become difficult due to compression caused by expansion or contraction of its rotor blades, for example. Further, if an attempt is made to keep the gap between electromagnets and permanent magnets appropriate with use of an electromechanical device, not only does the structure become complicated, but also the weight of rotor blades, etc. is increased. Although there is no problem when a shrouded rotating wing is used without a sudden change in direction, in the case of a large caliber used in a horizontal direction, a strong force based on a gyro effect is developed against the shroud if the direction is changed suddenly.

SUMMARY OF THE INVENTION

Accordingly, the present invention provides a shrouded rotating wing including a duct (hereinafter referred to as "rotatable duct") having permanent magnets and capable of stable rotation by a rotating magnetic field created by electromagnets disposed within a shroud. The shroud and the rotatable duct are in constant vertical contact with each other. The inner periphery of the shroud faces the outer periphery of the rotatable duct located inside the shroud with an appropriate gap therebetween to allow for expansion and contraction of the rotatable duct itself or of rotor blades connected to the inner periphery of the rotatable duct. Electromagnets are arranged around the inner periphery of the shroud, while permanent magnets are arranged around the outer periphery of the rotatable duct corresponding to the electromagnets. Therefore, when a rotating magnetic field is developed in the shroud, the rotatable duct rotates in response thereto.

In the case where the rotor blades whose wing tips (distal ends) are connected to the inner periphery of the rotatable duct are of a small caliber, i.e. a radius of about 3 m, the inner ends thereof are connected directly to a hub or a central shaft defining an axis of rotation. In the case of a large caliber exceeding a radius of about 5 m, a support portion that is rotatable (hereinafter referred to as "rotatable support ring"), for vertically supporting the rotor blades, is provided on said rotatable support portion at about halfway on the length of the rotor blades to prevent the rotor blades from being deflected or distorted by their own weight.

Thus, the shrouded rotating wing of the present invention has, as main components, a shroud, rotatable duct, rotatable support ring(s), hub or shaft, and rotor blades. Even when the shrouded rotating wing is of a large caliber, deflection and distortion of the rotor blades can be prevented by the rotatable support ring(s), as a countermeasure to the influence of both centrifugal force and heat.

Further, since the tip (distal end) of each blade is connected to the rotatable duct, even if the rotor blades are attached to a turntable which changes the direction rapidly, the force generated by a gyro effect and imposed on the wing tips is dispersed by the rotary duct and a strong force that might otherwise cause damage to the shroud is avoided. Accordingly, it is possible to ensure constant and stable rotation and hence the resulting lift and thrust can be obtained in a stable manner.

In comparison with the conventional devices which can afford only a small lift despite high horsepower, the present invention permits the generation of a large lift with even less power. Therefore, if instead of a drive unit connected to a rotating shaft to rotate blades and obtain lift as in a conventional helicopter, the rotatable duct type shrouded rotating wing based on the linear motor driving principle according to the present invention is used as a main rotor, it is possible to attain a reduction in weight, simplification of structure, and saving of fuel consumption. Further, while conventional shrouded rotating wings are difficult to use horizontally if they have a large radius, according to the present invention, not only can rotor blades of a large radius be used in a horizontal position, but also when such rotor blades are used as a turntable which changes the blow-off direction rapidly, it is possible to obtain a stable driving force. Thus, the shrouded rotating wing of the present invention is usable in the manner disclosed in Japanese Patent Application 2003-290873.

In a conventional rotorcraft such as a helicopter, the transfer of generated lift to the body of the rotorcraft is performed through the central portions of the rotor blades, and wing tips (blade distal ends) are free. Therefore, at the wing tips where the air speed is the highest of the mass points on the rotor blades, it is necessary to prevent the wing tips from being bent upward due to a relative excess of lift. More particularly, it is necessary to use a complicated structure including a twist which is effected for example by varying the angle of elevation of the rotor blades between wing tips and wing center. On the other hand, in the present invention, since the transfer of generated lift is performed at the wing tips, there is no fear of the wing tips being bent upward. Therefore, twisting of the rotor blades is not necessary and the manufacturing cost can be reduced.

Thus, the present invention provides a lift device and a thrust device both capable of producing a light-weight and strong air flow volume in a stable manner when applied to a helicopter, a flying platform, or such a flying body as in Japanese Patent Application 2003-290873.

DESCRIPTION OF THE PREFERRED EMBODIMENTS

FIGS. 1 to 8 illustrate a rotatable duct type shrouded rotating wing according to an embodiment of the present invention wherein electromagnets 3 are arranged around the inner periphery of a shroud 2, while permanent magnets 4 are arranged on the outer periphery of a rotatable duct 5, and a rotating magnetic field is generated by the shroud-side electromagnets 3 to rotate the rotatable duct 5 and rotor blades 6, with consequent generation of lift and thrust.

In the rotating wing, the air speed at mass points thereof increases with distance from the rotational center. Therefore, when the angles of elevation of the rotor blades are the same at any position, the lift at wing tips becomes excessive in comparison with that at the inner wing (blade) ends, resulting in the wing tips being bent upward with rotation of the rotor blades, and the lift against the underlying position decreasing. To avoid this problem, open wing-tip rotor blades used in the recent rotorcrafts are designed such that the angle of elevation of each rotor blade is made deep near its inner end and made shallow near its outer end ("distal end" or "wing tip") to prevent the wing tip from being bent upward, thereby permitting a uniform lift to be obtained throughout the whole of the rotor blades. Such a design is unavoidable in the conventional rotorcrafts such as helicopters because the lift generated in the rotor blades is used as the lift of the rotorcraft body via a rotary shaft located at the wing center. However, an optimized balance between the air resistance of rotation and the generated lift is present at only a part on the rotor blades, and in the other portions the angle of elevation has not so far been considered optimal. On the other hand, in the present invention, lift is transferred to a rotorcraft body via the wing tips, so there is no problem even if the generated lift is offset to wing tips. Thus, an optimized value of elevation angle can be provided at all portions of the rotor blades. For this reason, the rotor blades according to the present invention are flat and free of any twist.

Figure 8:
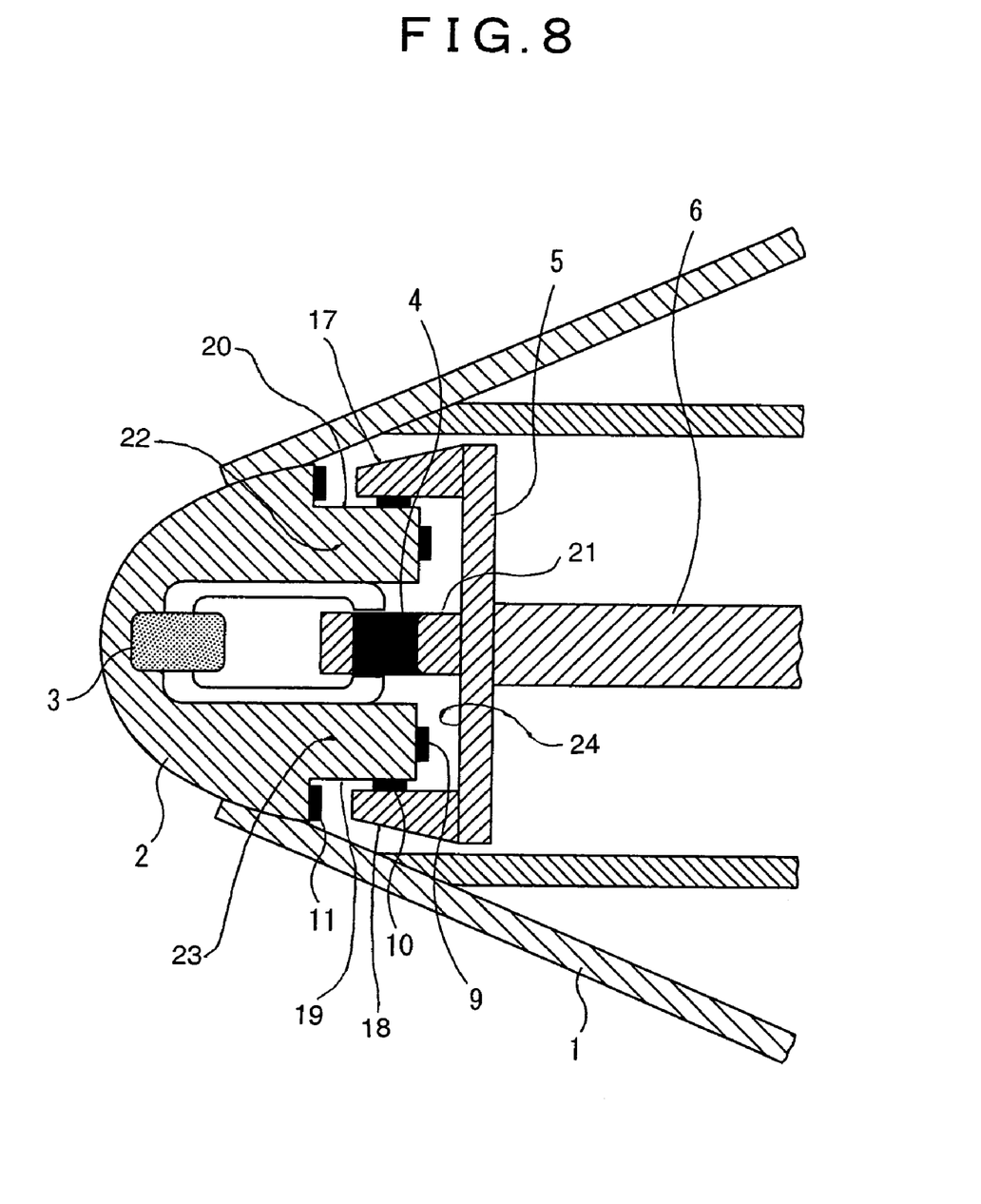
FIG. 8 is a vertical sectional view of the shroud, rotatable duct, and the vicinity thereof.

As best seen in FIG. 8, the rotatable duct 5 is formed a cylinder and upper and lower portions of the cylinder are constantly in contact with the shroud 2 through upper and lower bearings 10. Lift or thrust of the rotor blades 6 is transmitted to the shroud 2 side through the bearings 10. However, the outer periphery of the rotatable duct 5 and the inner periphery of the shroud 2 are normally spaced a predetermined distance from each other and not in contact. This distance is an appropriate distance such that when the rotating portion of the rotatable duct, for example, expands to its maximum extent due to centrifugal force or heat, it comes into contact with a bearing 9 and/or 11 provided on the shroud side and is thereby stabilized.

Figure 1:
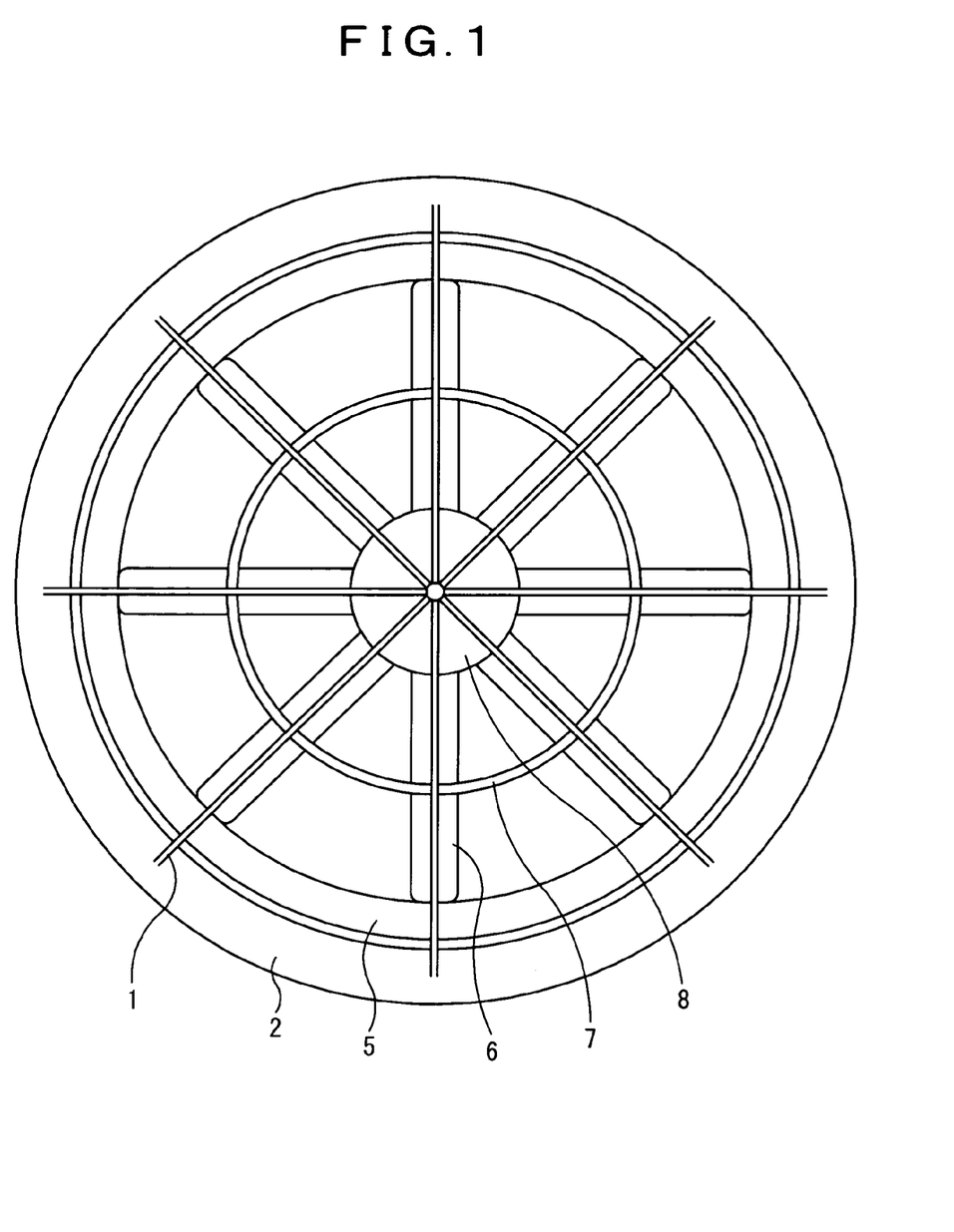
FIG. 1 is a schematic planar view of a first embodiment of a rotatable duct type shrouded rotating wing based on the linear motor driving principle according to the present invention.
Figure 2:
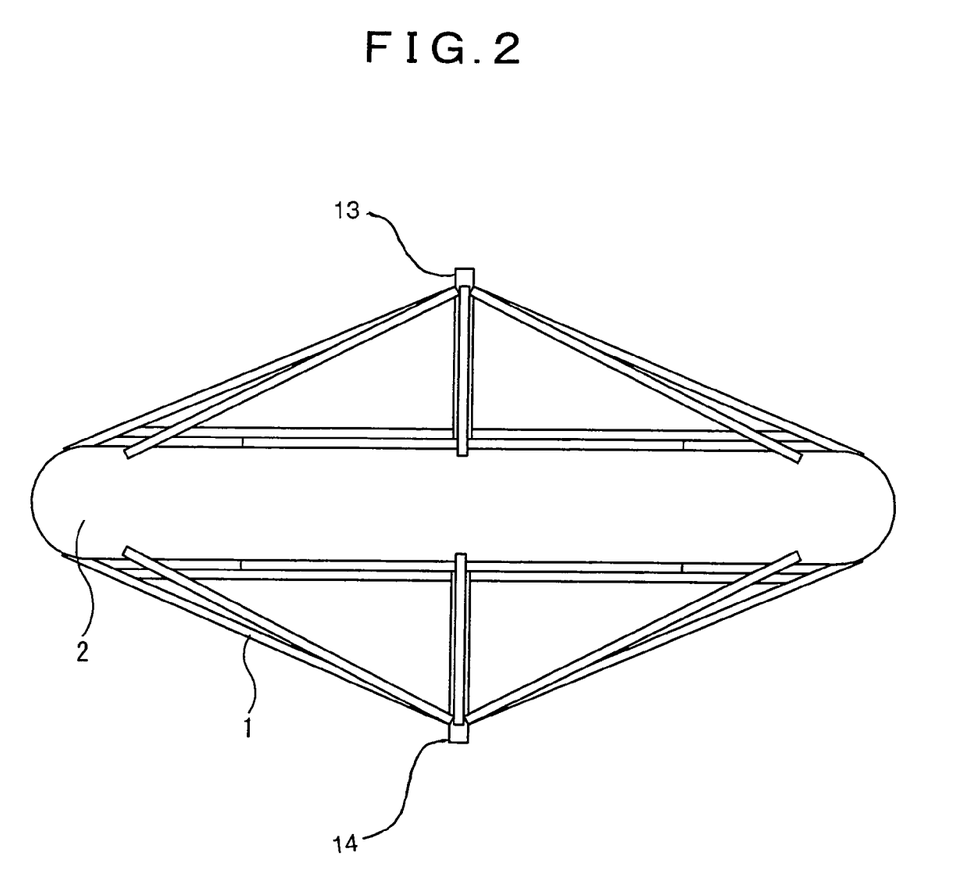
FIG. 2 is a front view of the rotatable duct type shrouded rotating wing (a side view thereof is also the same) of the first embodiment.
Figure 3:
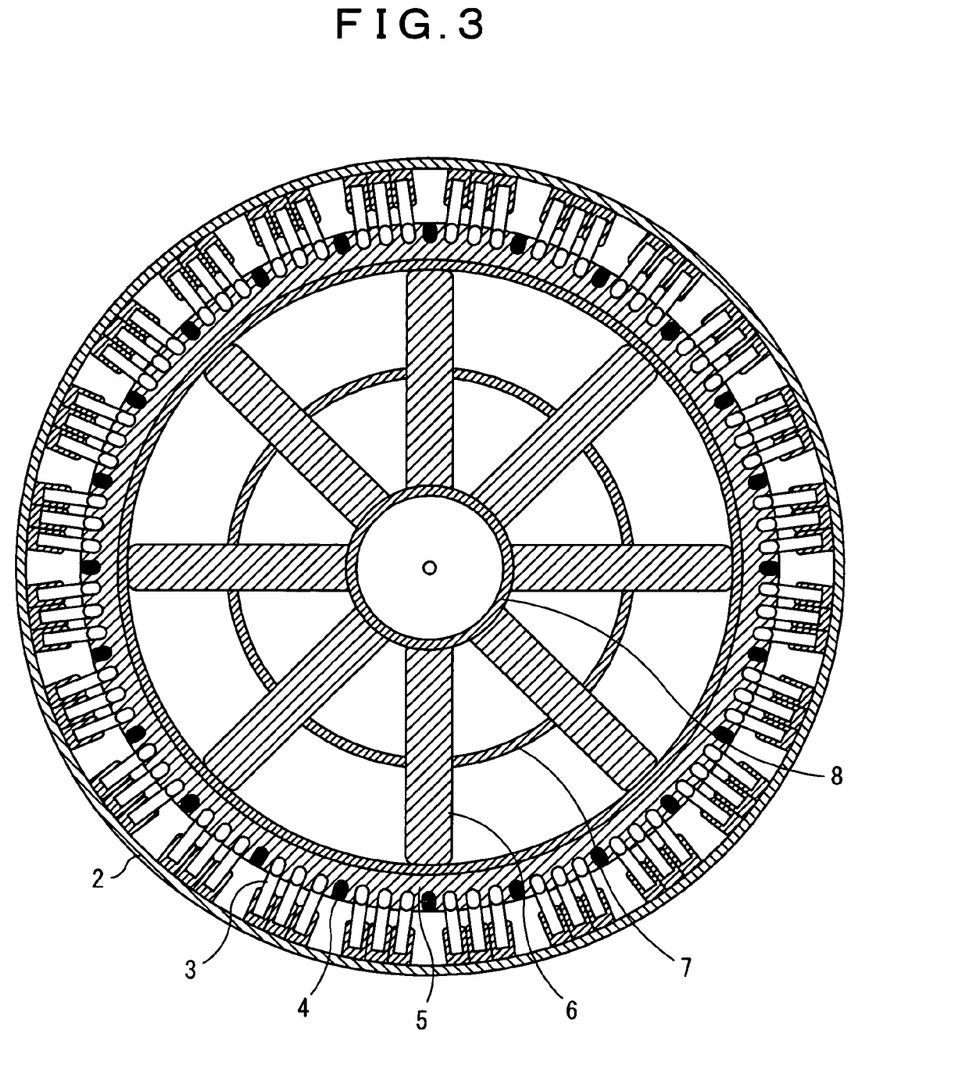
FIG. 3 is a horizontal sectional view of the rotatable duct type shrouded rotating wing of the first embodiment.
Figure 4:
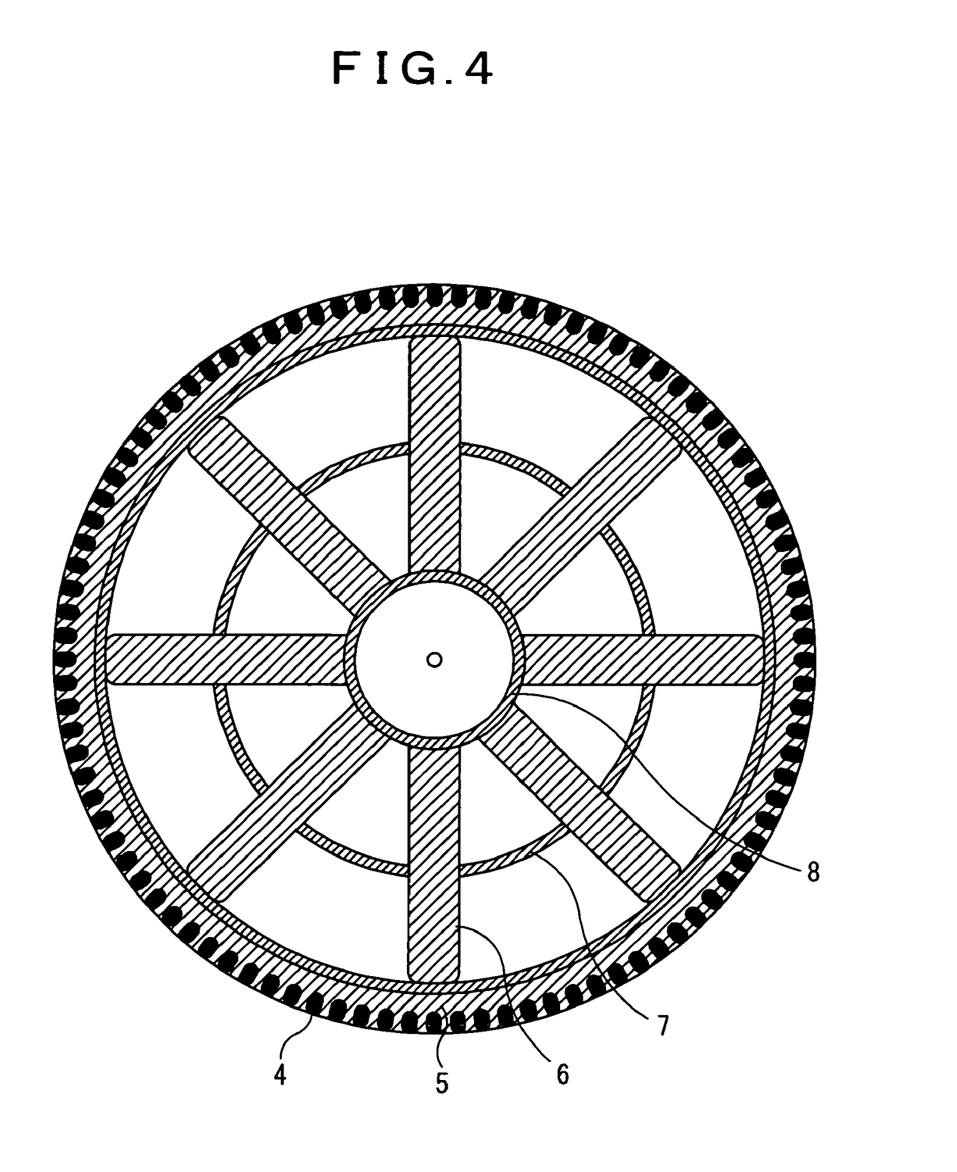
FIG. 4 is a horizontal sectional view of only the rotatable elements, i.e. the rotatable duct and rotor blades, in the rotary duct type shrouded rotating wing of the first embodiment.
Figure 5:
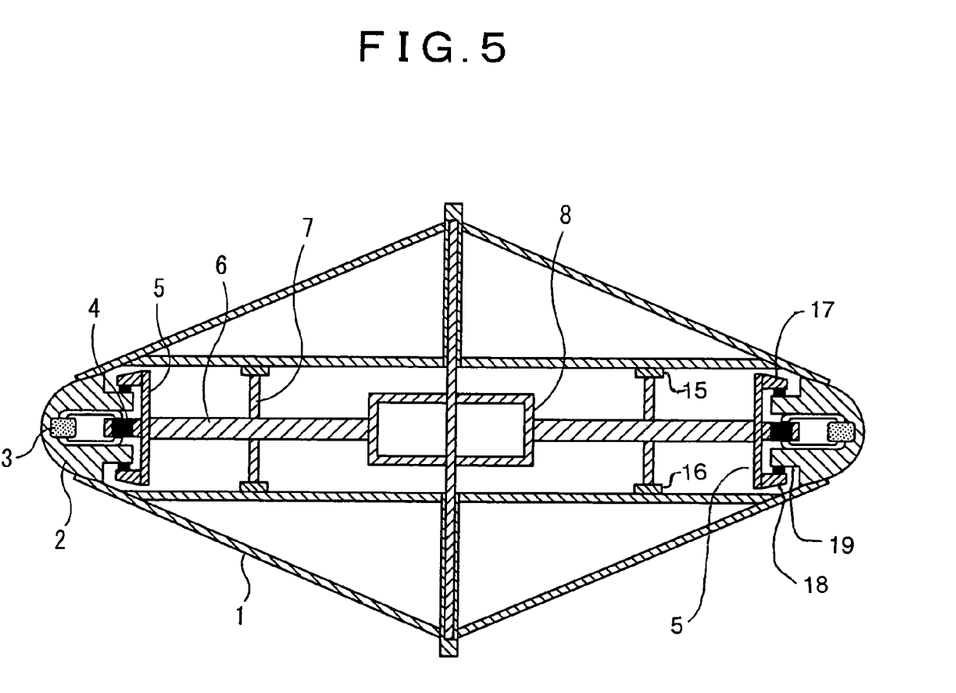
FIG. 5 is a vertical sectional view of the rotatable duct type shrouded rotating wing of the first embodiment.
Figure 6:
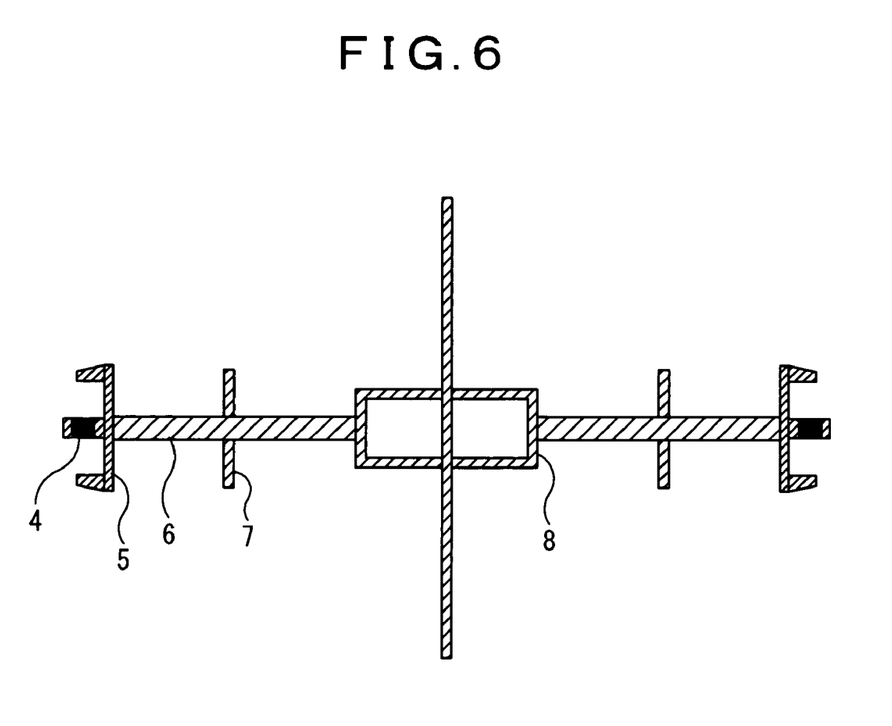
FIG. 6 is a vertical sectional view of only the rotatable elements, i.e. the rotatable duct and the rotor blades, in the rotary duct type shrouded rotating wing of the first embodiment.
Figure 7:
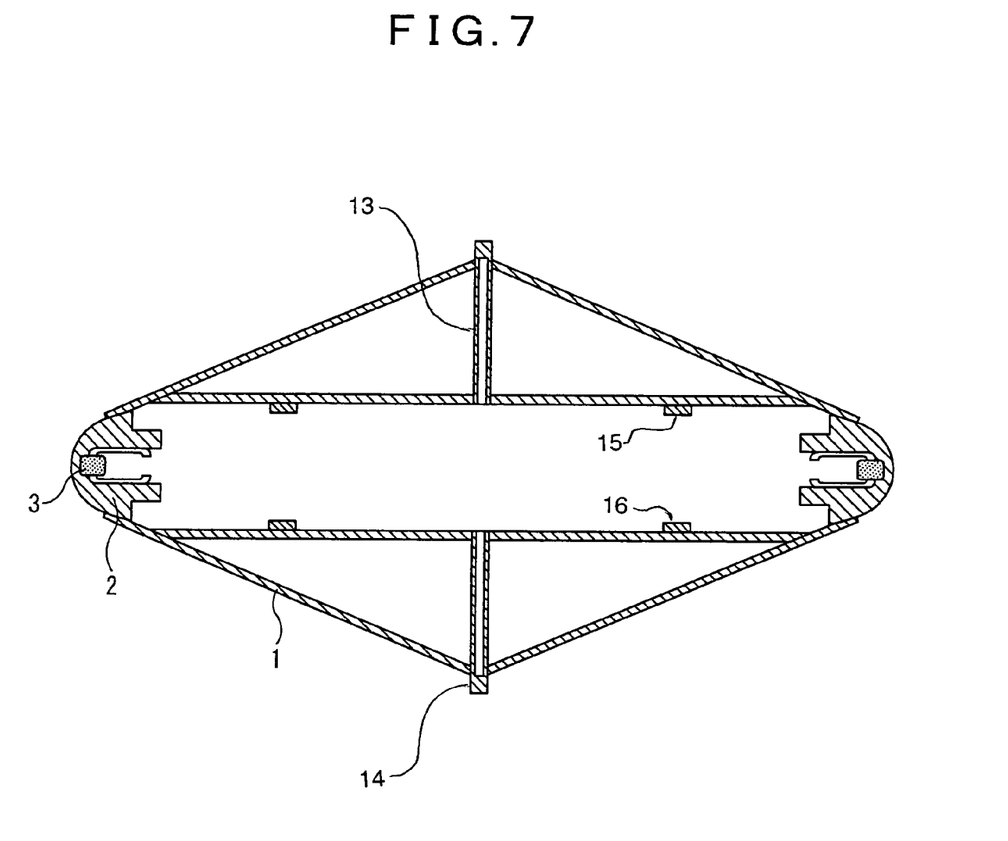
FIG. 7 is a vertical sectional view of only fixed elements such as the shroud and fixed support portion in the rotatable duct type shrouded rotating wing of the first embodiment.

As shown in FIGS. 1, 2 and 7 fixed support bars 1, in a number corresponding to the number of blades 6, are connected to an upper portion of the shroud 2 and extend upward and inwardly to connection with an upper shaft 13. Likewise, a plurality of fixed support bars 1, in a number corresponding to the number of blades 6, are connected to a lower surface of the shroud 2 and extend downward and inwardly to connection with a lower shaft 14.

As shown in FIGS. 1, 3, 4, 5 and 6, a rotatable support ring(s) 7 is fixed to and extends vertically above and below blades 6. The upper and lower ends of the rotatable support ring 7 respectively ride on upper and lower support elements 15 and 16.

As best seen in FIG. 8, the rotatable duct 5 has upper and lower flange elements 17, 18 which extend radially outward from its outer peripheral surface 24. These flange elements 17, 18 are in contact with fixed, annular horizontal surfaces 20, 19, respectively provided on arms 22 and 23 of the shroud 2. A magnet support 21, in which permanent magnets 4 are mounted extends between flange elements 17, 18, radially outward from the outer peripheral surface 24 of the rotatable duct 5, and into the space between arms 22, 23 of the shroud 2.

Figure 9:
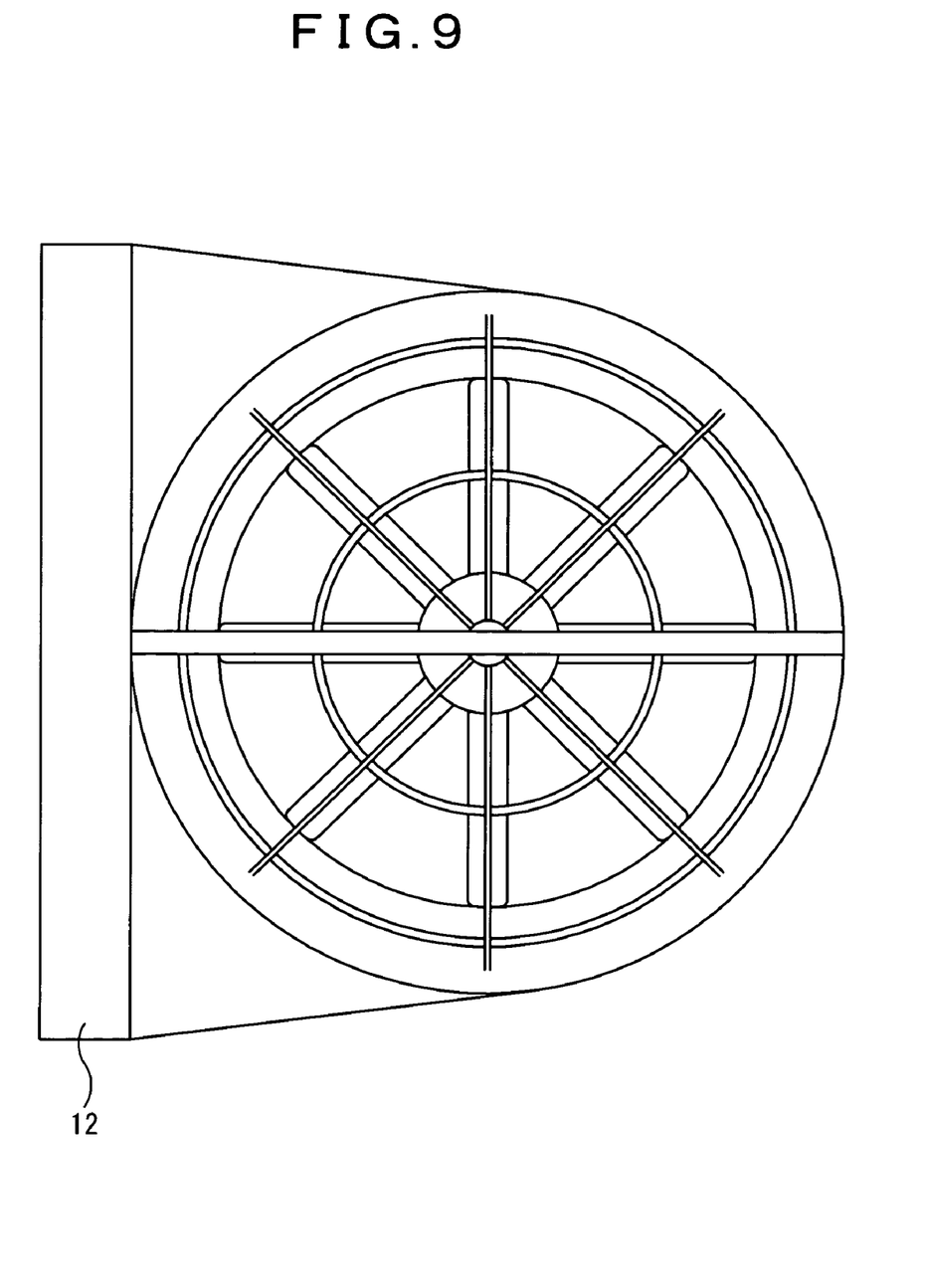
FIG. 9 is a plan view of the rotatable duct type shrouded rotating wing as mounted to a turntable in a second embodiment.
Figure 10:
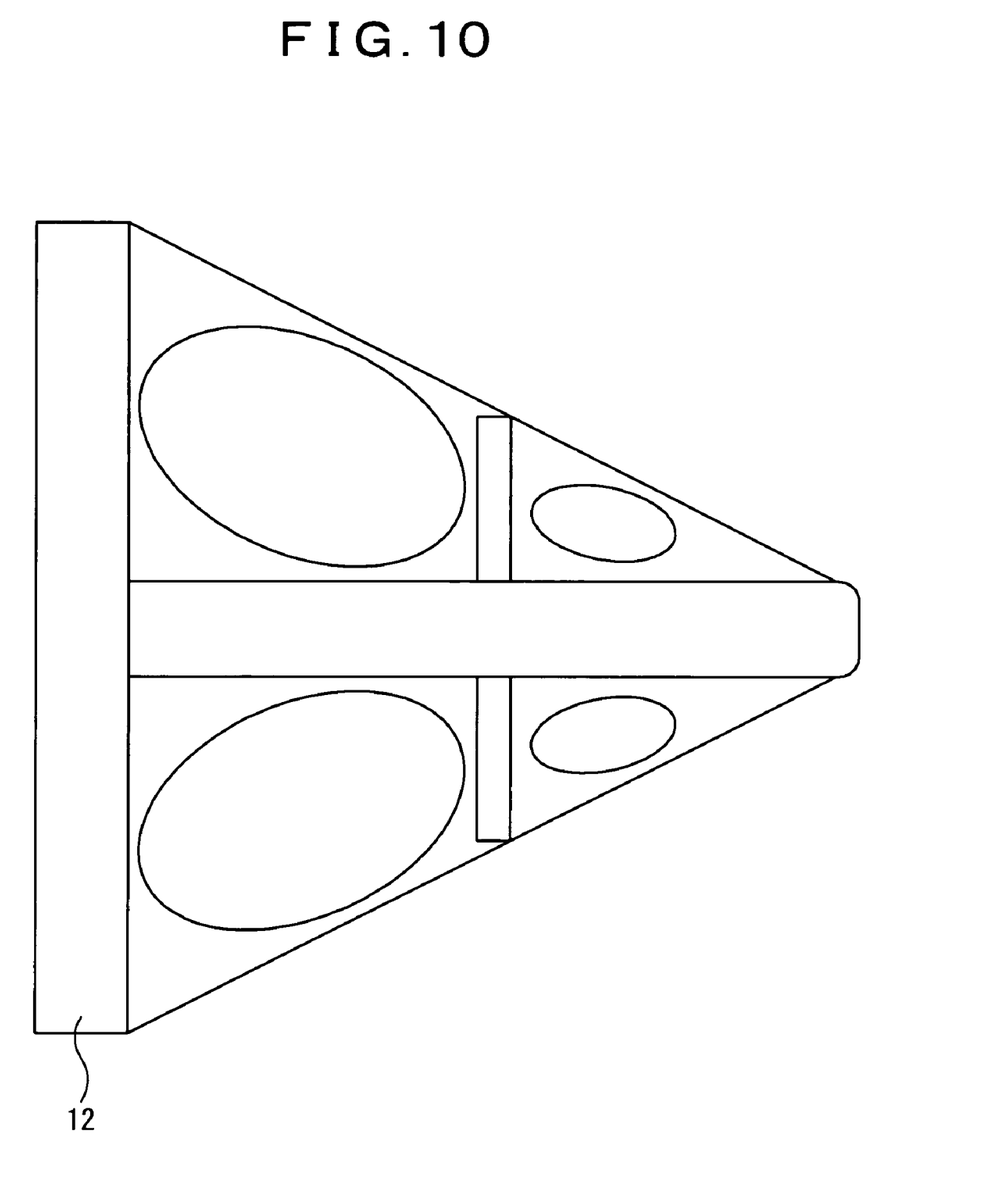
FIG. 10 is a front view of the rotatable duct type shrouded rotating wing as mounted to the turntable.
Figure 11:
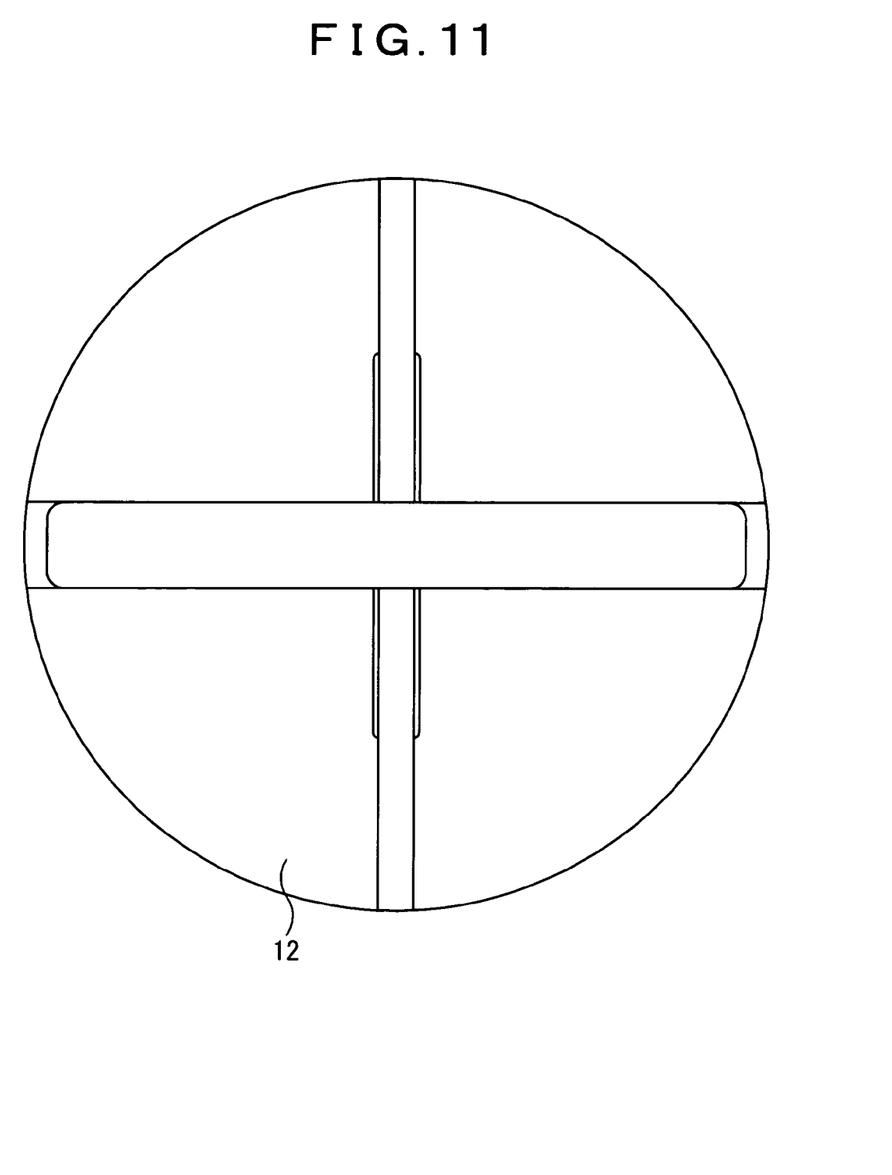
FIG. 11 is a side view of the rotatable duct type shrouded rotating wing as mounted to the turntable.

FIGS. 9 to 11 illustrate a second embodiment of the present invention in which the rotatable duct type shrouded rotating wing is mounted as a turntable (a rapid wind direction changer) which is used as disclosed in Japanese Patent Application 2003-290873.

The invention claimed is:

1. A rotatable duct type shrouded rotating wing having a central opening exceeding a radius of approximately 3 m, operating on the principle of a linear motor, and comprising:
a fixed shroud with electromagnets for establishing a rotating magnetic field in the interior thereof;
a cylindrical rotatable duct horizontally and rotatably mounted within and horizontally spaced from the shroud, the rotatable duct having an outer cylindrical surface and permanent magnets mounted on the outer cylindrical surface, the rotatable duct being vertically supported by the shroud;
a plurality of rotor blades having distal ends fixed to an inner periphery of the duct and inner ends fixed to a central hub or shaft; and
a rotatable support formed in the shape of a cylinder and vertically sandwiching said rotor blades, the rotatable support beginning in contact at upper and lower ends with fixed horizontal support surfaces fixed to the shroud, thereby vertically supporting the rotor blades at a position intermediate the inner ends and distal ends of the rotor blades to prevent the rotor blades from being deflected or distorted by their own weight and to limit the influence of both centrifugal force and heat on expansion and contraction of the rotatable duct, the rotatable support being fixed to and rotatable together with the rotor blades.

2. The rotatable duct type shrouded rotating wing according to claim 1 further comprising fixed support rails fixed to the shroud and extending from the shroud to inner ends fixed to the central hub or shaft.

3. The rotatable duct type shrouded rotating wing according to claim 1 wherein the rotatable duct has a pair of spaced flanges extending radially outward from its outer cylindrical surface and in contact with upper and lower horizontal support surfaces of the shroud through bearings.

4. The rotatable type shrouded rotating wing according to claim 3 wherein the shroud has spaced upper and lower arms presenting, respectively, the upper and lower horizontal support surfaces and extending into the space between the flanges extending from the outer cylindrical surface of the cylindrical rotatable duct.

5. The rotatable type shrouded rotating wing according to claim 4 wherein the cylindrical rotatable duct has a magnet support extending radially outward from its outer cylindrical surface into the space between the upper and lower arms of the shroud and wherein the permanent magnets are mounted in the magnet support.

* * * * *

UNITED STATES PATENT AND TRADEMARK OFFICE
CERTIFICATE OF CORRECTION

PATENT NO.        : 7,503,747 B2
APPLICATION NO. : 10/586652
DATED             : March 17, 2009
INVENTOR(S)       : Kaidou Ikeda

Page 1 of 1

It is certified that error appears in the above-identified patent and that said Letters Patent is hereby corrected as shown below:

Column 6, line 34 (claim 1, line 17) "beginning" should read -- being --.

Signed and Sealed this

Twenty-first Day of July, 2009

JOHN DOLL
*Acting Director of the United States Patent and Trademark Office*